US009779567B1

(12) United States Patent
Shen

(10) Patent No.: US 9,779,567 B1
(45) Date of Patent: Oct. 3, 2017

(54) DOOR LOCK USING A MOBILE DEVICE AS AN INPUT INTERFACE

(71) Applicant: I-Ting Shen, Tainan (TW)

(72) Inventor: I-Ting Shen, Tainan (TW)

( * ) Notice: Subject to any disclaimer, the term of this patent is extended or adjusted under 35 U.S.C. 154(b) by 0 days.

(21) Appl. No.: 15/378,169

(22) Filed: Dec. 14, 2016

(30) Foreign Application Priority Data

Nov. 24, 2016 (TW) ............................ 105138545 A

(51) Int. Cl.

| | |
|---|---|
| ***G05B 19/00*** | (2006.01) |
| ***G07C 9/00*** | (2006.01) |
| ***E05B 63/00*** | (2006.01) |
| ***E05B 47/00*** | (2006.01) |
| ***E05B 55/00*** | (2006.01) |
| ***E05B 43/00*** | (2006.01) |

(52) U.S. Cl.

CPC .......... *G07C 9/00182* (2013.01); *E05B 43/00* (2013.01); *E05B 47/0001* (2013.01); *E05B 55/005* (2013.01); *E05B 63/0069* (2013.01); *E05B 2047/0058* (2013.01); *E05B 2047/0095* (2013.01); *G07C 2009/0019* (2013.01)

(58) Field of Classification Search

CPC ........ G07C 9/00182; G07C 2009/0019; E05B 63/0069; E05B 47/0001; E05B 43/00; E05B 55/005; E05B 2047/0095; E05B 2047/0058

USPC ............. 340/5.2, 5.51, 5.61, 5.25, 5.65, 5.7; 70/91, 256, 263, 277, 278.1

See application file for complete search history.

(56) References Cited

U.S. PATENT DOCUMENTS

| | | | | |
|---|---|---|---|---|
| 9,652,917 B2 * | 5/2017 | Johnson | ............. | G07C 9/00309 |
| 2015/0199683 A1 * | 7/2015 | Incedayi | .............. | G06Q 20/382 705/44 |
| 2016/0093130 A1 * | 3/2016 | Shen | ................. | G07C 9/00015 340/5.61 |

* cited by examiner

*Primary Examiner* — Dhaval Patel

(74) *Attorney, Agent, or Firm* — Alan D. Kamrath; Kamrath IP Lawfirm, P.A.

(57) ABSTRACT

A door lock uses a mobile device as an input interface. The door lock includes a latch device mounted to a door, an outer operating device mounted to an outer face of the door, and an inner operating device mounted to an inner face of the door. The outer operating device includes a contact-type connection interface for contact-type connection with the mobile device. After the mobile device is in electrical connection with the outer operating device, an input device of the mobile device is used to input a to-be-identified identification information to the door lock, and the door lock identifies whether the to-be-identified identification information matches authenticated identification information for subsequent unlocking operation or remaining in a locked state.

17 Claims, 6 Drawing Sheets

DOOR LOCK USING A MOBILE DEVICE AS AN INPUT INTERFACE

BACKGROUND OF THE INVENTION

The present invention relates to a door lock using a mobile device as an input interface and, more particularly, to an electric door lock permitting use of a mobile device, such as a smart phone, a tablet computer, a personal digital assistant, or a notebook computer, as an identification information input source for executing an unlocking procedure on an outer operating device of the door lock.

Current door locks using electronic control generally utilize wireless techniques to transmit the identification information for unlocking purposes. In an example of a door lock system using a radio frequency identification (RFID) card, a transmitter must be mounted to an outer side of the door lock to continuously or intermittently transmit signals for searching for a user holding an RFID card for unlocking purposes. Thus, the transmitter consumes electricity continuously. Although an ordinary building can supply electricity to an electric door lock, a professional technician is required to take care of the wiring which can be handled during construction if the building is still under construction. As a result, most of the electric door locks available in the market use batteries as the power source instead of the indoor electricity.

However, the transmitter of the battery-powered electric door locks still continuously consumes the power of the batteries even in the standby state, and the electric door locks could not operate normally when out of electricity. Thus, the battery-powered electric door locks require frequent replacement of batteries, failing to provide use convenience.

Another type of electric door lock uses an input device, such as a keypad or a touch screen, to permit manual input of the identification information. However, the input device could leave trace to burglars due to frequent touching or pressing of some of the keys, causing safety risks.

BRIEF SUMMARY OF THE INVENTION

In a first aspect, a door lock includes a latch device preset to a locked state. A driving device is operatively connected to the latch device and is configured to set the latch device to an unlocked state. An inner operating device includes a control module and a main memory electrically connected to the control module. Authenticated identification information is stored in the main memory. The control module is electrically connected to the driving device. An outer operating device includes a first contact-type connection interface electrically connected to the control module. A mobile device includes a processing module, a second contact-type connection interface, an input device, and a battery module. The second contact-type connection interface, the input device, and the battery module are electrically connected to the processing module. The second contact-type connection interface is detachably and electrically connected to the first contact-type connection interface of the outer operating device or is not electrically connected to the first contact-type connection interface of the outer operating device.

When the second contact-type connection interface is not in electrical connection with the first contact-type connection interface of the outer operating device, the latch device is in the locked state, the mobile device does not execute an authentication procedure and does not execute a power supply procedure, a to-be-identified identification information inputted through the input device is not sent to the control module, and the battery module of the mobile device does not provide electricity to the control module.

When the second contact-type connection interface is in electrical connection with the first contact-type connection interface of the outer operating device, the mobile device executes the authentication procedure and the power supply procedure, the to-be-identified identification information is inputted through the input device to the control module, and the battery module of the mobile device provides electricity to the control module.

When the to-be-identified identification information in the control module does not match the identified identification information in the main memory, the control module does not output a signal to the driving device, and the latch device remains in the locked state. When the to-be-identified identification information in the control module matches the identified identification information in the main memory, the control module outputs a signal to the driving device to set the latch device to the unlocked state.

The latch device can include a locking mechanism operatively connected to the driving device and a latch movable between a latching position and an unlatching position. The driving device is configured to actuate the locking mechanism for setting the latch device to the unlocked state. The outer operating device further includes an outer unlatching mechanism operatively connected to the latch and the locking mechanism. When the latch device is in the locked state, the latch does not move from the latching position to the unlatching position when the outer unlatching mechanism is operated. When the latch device is in the unlocked state, the latch moves from the latching position to the unlatching position when the outer unlatching mechanism is operated.

The inner operating device can further include an inner unlatching mechanism. When the latch device is in the locked or unlocked state, the latch moves from the latching position to the unlatching position when the inner unlatching mechanism is operated.

The inner operating device can further include a delay module preset with a delay time. When the latch device is in the locked state, the delay module does not operate. When the latch device is in the unlocked state, the delay module starts a countdown of the delay time, and the latch device remains in the unlocked state during the countdown of the delay time. After the countdown of the delay time, the control module outputs a locking signal to the driving device, and the driving device actuates the locking mechanism to set the latch device to the locked state.

The inner operating device can further include an authentication module configured to execute an identification information log-in procedure or an identification information log-in disabling procedure. When the identification information log-in procedure is executed by the authentication module, the to-be-identified identification information picked up by the input device of the mobile device is registered in the main memory as the authenticated identification information. When the identification information log-in disabling procedure is executed by the authentication module, the to-be-identified identification information picked up by the input device of the mobile device is not registered in the main memory as the authenticated identification information.

In a second aspect, the door lock includes a latch device preset to a locked state. A driving device is operatively connected to the latch device and is configured to set the latch device to an unlocked state. An inner operating device includes a control module and a main memory electrically connected to the control module. Authenticated identification information is stored in the main memory. The inner operating device further includes a main battery module electrically connected to the control module and configured to supply electricity. The control module is electrically connected to the driving device. An outer operating device includes a first contact-type connection interface electrically connected to the control module. A mobile device includes a processing module, a second contact-type connection interface, an input device, and a battery module. The second contact-type connection interface, the input device, and the battery module are electrically connected to the processing module. The second contact-type connection interface is detachably and electrically connected to the first contact-type connection interface of the outer operating device or is not electrically connected to the first contact-type connection interface of the outer operating device.

When the second contact-type connection interface is not in electrical connection with the first contact-type connection interface of the outer operating device, the latch device is in the locked state, the mobile device does not execute an authentication procedure, and a to-be-identified identification information inputted through the input device is not sent to the control module.

When the second contact-type connection interface is in electrical connection with the first contact-type connection interface of the outer operating device, the mobile device executes the authentication procedure, and the to-be-identified identification information is inputted through the input device to the control module.

When the to-be-identified identification information in the control module does not match the identified identification information in the main memory, the control module does not output a signal to the driving device, and the latch device remains in the locked state. When the to-be-identified identification information in the control module matches the identified identification information in the main memory, the control module outputs a signal to the driving device to set the latch device to the unlocked state.

The inner operating device can further include an inner unlatching mechanism. When the latch device is in the locked or unlocked state, the latch moves from the latching position to the unlatching position when the inner unlatching mechanism is operated.

The inner operating device can further includes a delay module preset with a delay time. When the latch device is in the locked state, the delay module does not operate. When the latch device is in the unlocked state, the delay module starts countdown of the delay time, and the latch device remains in the unlocked state during the countdown of the delay time. After the countdown of the delay time, the control module outputs a locking signal to the driving device, and the driving device actuates the locking mechanism to set the latch device to the locked state.

The inner operating device can further include an authentication module configured to execute an identification information log-in procedure or an identification information log-in disabling procedure. When the identification information log-in procedure is executed by the authentication module, the to-be-identified identification information picked up by the input device of the mobile device is registered in the main memory as the authenticated identification information. When the identification information log-in disabling procedure is executed by the authentication module, the to-be-identified identification information picked up by the input device of the mobile device is not registered in the main memory as the authenticated identification information.

In a third aspect, a door lock includes a latch device preset to a locked state. A driving device operatively connected to the latch device and is configured to set the latch device to an unlocked state. An inner operating device includes a control module, a network module electrically connected to the control module, and a main battery module configured to supply electricity. The control module is electrically connected to the driving device. An outer operating device includes a first contact-type connection interface electrically connected to the control module. A mobile device includes a processing module, a second contact-type connection interface, an input device, and a battery module. The second contact-type connection interface, the input device, and the battery module are electrically connected to the processing module. The second contact-type connection interface is detachably and electrically connected to the first contact-type connection interface of the outer operating device or is not electrically connected to the first contact-type connection interface of the outer operating device. A management server is configured to selectively and electrically connected to the network module of the inner operating device. Authenticated identification information is stored in the management server.

When the second contact-type connection interface is not in electrical connection with the first contact-type connection interface of the outer operating device, the latch device is in the locked state, the mobile device does not execute an authentication procedure, and a to-be-identified identification information inputted through the input device is not sent to the control module.

When the second contact-type connection interface is in electrical connection with the first contact-type connection interface of the outer operating device, the mobile device executes the authentication procedure, the network module is connected to the management server, and the to-be-identified identification information is inputted through the input device to the control module and is transmitted through the network module to the management server.

When the management server identifies that the to-be-identified identification information in the control module does not match the identified identification information in the management server, the control module does not output a signal to the driving device, and the latch device remains in the locked state. When the management server identifies that the to-be-identified identification information in the control module matches the identified identification information in the management server, the control module outputs a signal to the driving device to set the latch device to the unlocked state.

The inner operating device can further include a charging module electrically connected between the main battery module and the first contact-type connection interface of the outer operating device. The charging module is configured to detect electricity of the main battery module. If the second contact-type connection interface is in electrical connection with the first contact-type connection interface of the outer operating device, the mobile device does not execute a charging procedure when the electricity of the main battery module detected by the charging module is greater than a threshold electricity value, and the battery module of the mobile device does not charge the main battery module. If the second contact-type connection interface is in electrical connection with the first contact-type connection interface of the outer operating device, the mobile device executes the charging procedure when the electricity of the main battery module detected by the charging module is lower than the threshold electricity value, and the battery module of the mobile device charges the main battery module.

The latch device can include a locking mechanism operatively connected to the driving device and a latch movable between a latching position and an unlatching position. The driving device is configured to actuate the locking mechanism for setting the latch device to the unlocked state. The outer operating device further includes an outer unlatching mechanism operatively connected to the latch and the locking mechanism. When the latch device is in the locked state, the latch does not move from the latching position to the unlatching position when the outer unlatching mechanism is operated. When the latch device in the unlocked state, the latch moves from the latching position to the unlatching position when the outer unlatching mechanism is operated.

The inner operating device can further include an inner unlatching mechanism. When the latch device is in the locked or unlocked state, the latch moves from the latching position to the unlatching position when the inner unlatching mechanism is operated.

The inner operating device can further include a delay module preset with a delay time. When the latch device is in the locked state, the delay module does not operate. When the latch device is in the unlocked state, the delay module starts countdown of the delay time, and the latch device remains in the unlocked state during the countdown of the delay time. After the countdown of the delay time, the control module outputs a locking signal to the driving device, and the driving device actuates the locking mechanism to set the latch device to the locked state.

The inner operating device can further include an authentication module configured to execute an identification information log-in procedure or an identification information log-in disabling procedure. When the identification information log-in procedure is executed by the authentication module, the to-be-identified identification information picked up by the input device of the mobile device is registered in the main memory as authenticated identification information. When the identification information log-in disabling procedure is executed by the authentication module, the to-be-identified identification information picked up by the input device of the mobile device is not registered in the main memory as authenticated identification information.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
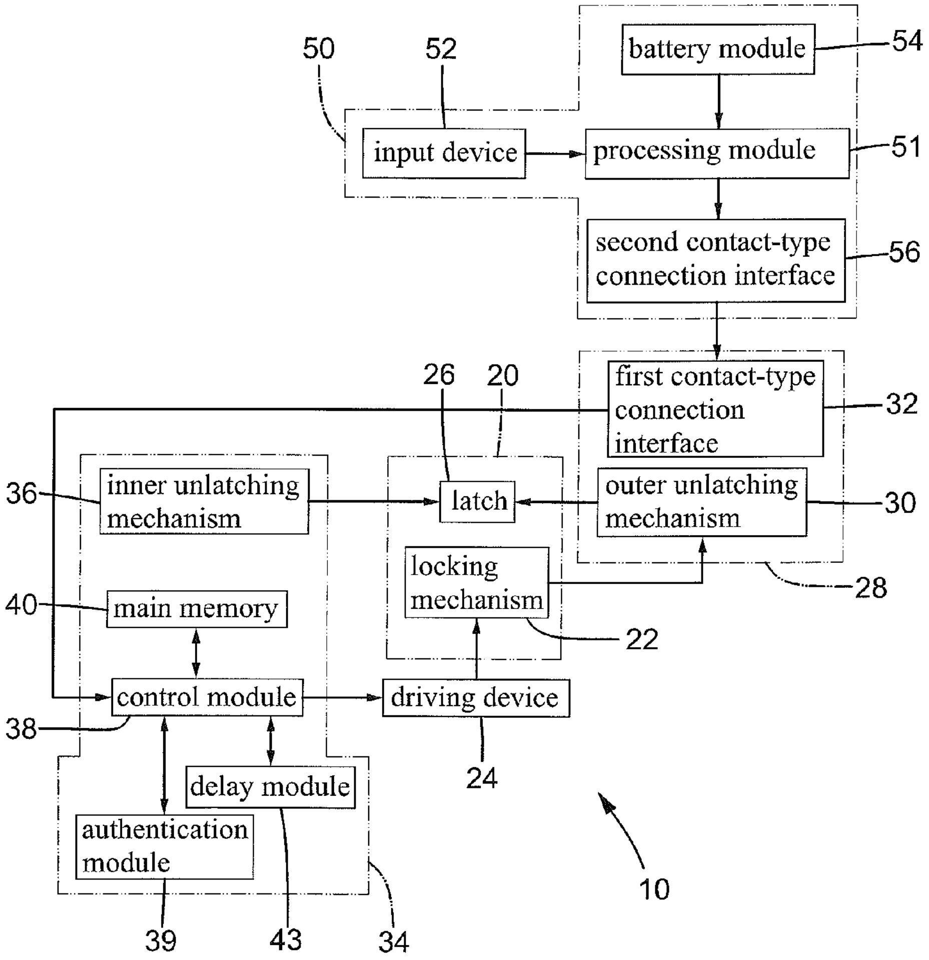
FIG. 1 is a diagrammatic block diagram illustrating a door lock with a mobile device of a first embodiment according to the present invention.
Figure 2:
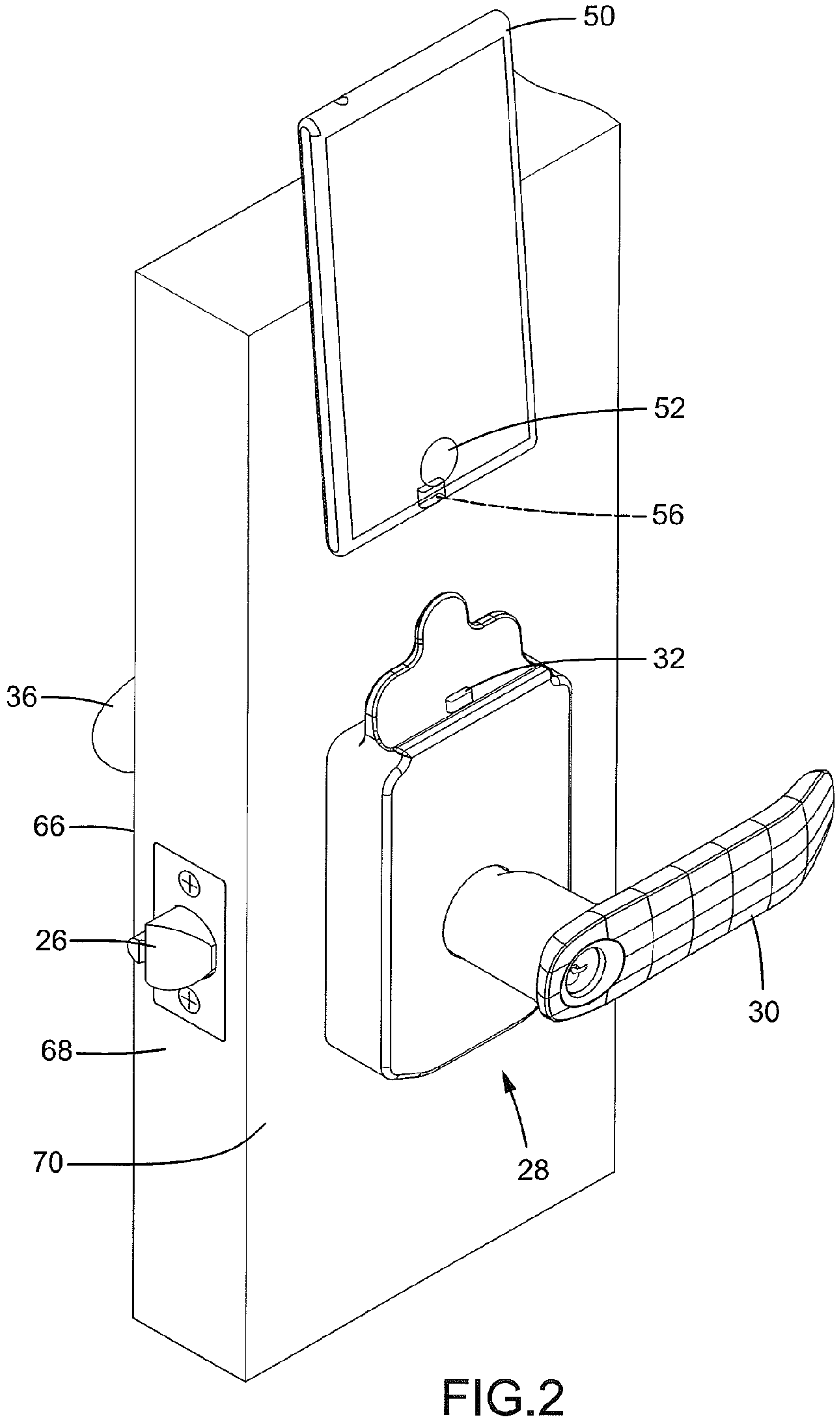
FIG. 2 is a perspective view illustrating use of the door lock and the mobile device of FIG. 1 on a door.
Figure 3:
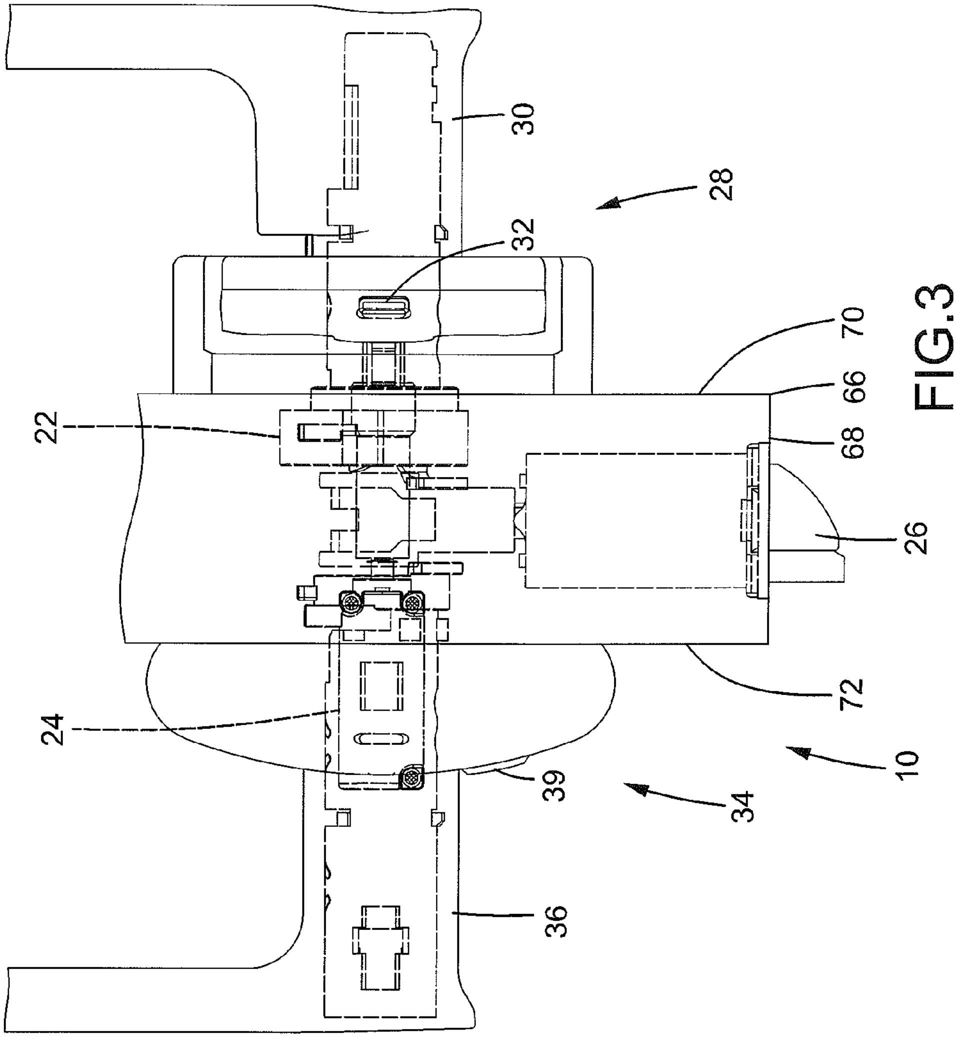
FIG. 3 shows a partial, top view of the door lock and the door of FIG. 2.
Figure 4:
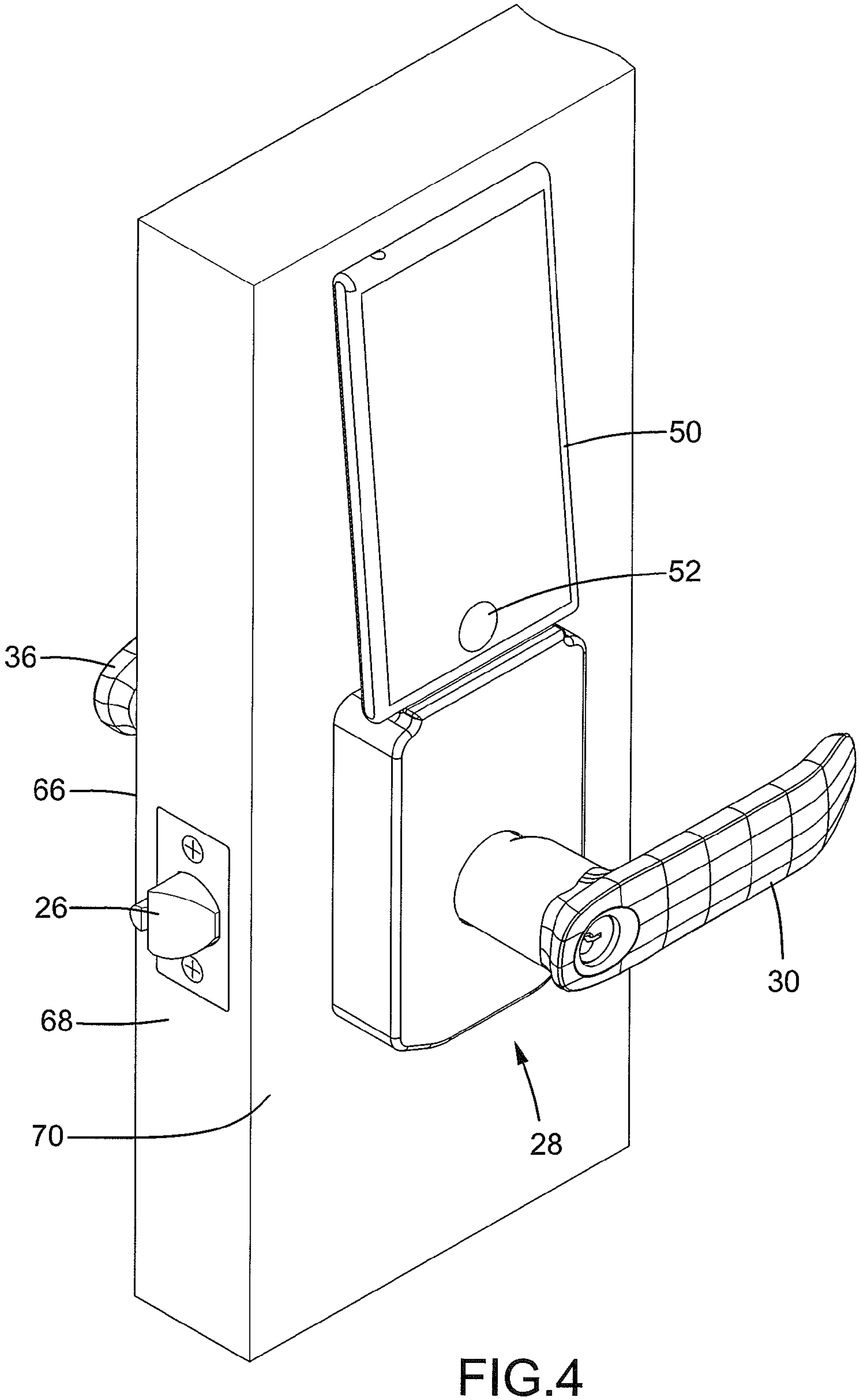
FIG. 4 is a perspective view similar to FIG. 2 with the mobile device electrically connected to the door lock.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms “first”, “second”, “inner”, “outer”, “face”, “side”, and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE INVENTION

FIGS. 1-4 show a door lock 10 with a mobile device 50 of a first embodiment according to the present invention. In this embodiment, door lock 10 is mounted to a door 66 having an outer face 70 and an inner face 72 opposite to outer face 70. Door 66 further includes an end face 68 extending between inner and outer faces 72 and 70.

Door lock 10 includes a latch device 20 mounted between inner and outer faces 72 and 70. Latch device 20 includes a latch 26 mounted to end face 68 of door 66 and a locking mechanism 22. Latch 26 can be operated to move between a latching position outside of end face 68 of door 66 and an unlatching position retracted into end face 68 of door 66. Latch device 20 is preset to a locking state by locking mechanism 22 and is operably connected to a driving device 24 driven by electricity. Driving device 24 is operably connected to locking mechanism 22 to permit latch device 20 to be set to an unlocked state. Driving device 24 can be a motor, an electromagnetic valve, etc.

Door lock 10 further includes an inner operating device 34 mounted to inner face 72 of door 66 and an outer operating device 28 mounted to outer face 70 of door 66. Outer operating device 28 includes an outer unlatching mechanism 30 operatively connected to latch 26 and locking mechanism 22. Outer operating device 28 further includes an exposed first contact-type connection interface 32, such as a universal serial bus (USB). Outer unlatching mechanism 30 can be an outer handle and a component jointly moveable with the outer handle.

Latch device 20 is normally set to the locked state by locking mechanism 22 cooperating with outer unlatching mechanism 30. Specifically, when latch device 20 is in the locked state, latch 26 cannot be moved from the latching position to the unlatching position by operating outer unlatching mechanism 30 of outer operating device 28. Locking mechanism 22 can be a mechanism preventing pivotal movement of the outer handle of outer unlatching mechanism 30. Thus, when latch device 20 is set to the locked state, the outer handle of outer unlatching mechanism 30 is locked by locking mechanism 22. On the other hand, when latch device 20 is set to the unlocked state, locking mechanism 22 releases the outer handle of outer unlatching mechanism 30.

Inner operating device 34 includes an inner unlatching mechanism 36 operatively connected to latch 26. Inner operating device 34 further includes a control module 38, an authentication module 39, a main memory 40, and a delay module 43. Authentication module 39, main memory 40, and delay module 43 are electrically connected to control module 38. Control module 38 is electrically connected to first contact-type connection interface 32. Main memory 40 can store at least one set of authenticated identification information. Delay module 43 is used to set a delay time, which can be 5-30 seconds, preferably 10 seconds. When latch device 20 is set to the locked state, delay module 43 starts to count down the set delay time.

Authentication module 39 includes a button mounted inside or exposed outside of inner operating device 34. The button can be pressed to activate authentication module 39, which, in turn, activates control module 38 to execute an identification information log-in procedure or to disable execution of the identification information log-in procedure (an identification information log-in disabling procedure). When the identification information log-in procedure is executed, main memory 40 is permitted to store to-be-identified identification information as authenticated identification information. When execution of the identification information log-in procedure is disabled (the identification information log-in disabling procedure), main memory 40 is not permitted to store the to-be-identified identification information as the authenticated identification information.

The first embodiment shown in FIGS. 1-4 further includes a mobile device 50 that can use an access program for executing an authentication procedure and a power supply procedure. Mobile device 50 includes a processing module 51, an input device 52, a battery module 54, and a second contact-type connection interface 56. Input device 52, battery module 54, and second contact-type connection interface 56 are electrically connected to mobile device 50. Second contact-type connection interface 56 can be a universal serial bus (USB) detachably and electrically connected to first contact-type connection interface 32. Mobile device 50 can be a smart phone, a tablet computer, a personal digital assistant (PDA), or a notebook computer. Input device 52 can be at least one of a fingerprint identification device, a touch screen, an iris recognition device, an audio identification device, and a finger vein identification device.

For the sake of explanation, it will be assumed that latch device 20 of door lock 10 is preset to the locked state. When second contact-type connection interface 56 of mobile device 50 is not in electrical connection with first contact-type connection interface 32 of outer operating device 28, latch device 20 remains in the locked state, such that latch 26 cannot be moved from the latching position and the unlatching position by operating outer unlatching mechanism 30 of outer operating device 28. As a result, entry from outside into inside of door 66 is prohibited. However, inner unlatching mechanism 36 of inner operating device 34 can be operated to move latch 26 from the latching position to the unlatching position. Thus, even though latch device 20 is in the locked state, passage from inside to outside of door 66 is permitted.

When door lock 10 is used for the first time, since no authenticated identification information is stored in main memory 40 of inner operating device 34, mobile device 50 cannot be used to change the locked state of latch device 20. Thus, it is firstly necessary to electrically connect second contact-type connection interface 56 of mobile device 50 to first contact-type connection interface 32 of outer operating device 28 to thereby execute the access program of mobile device 50 to proceed with the authentication procedure and the power supply procedure. Battery module 54 of mobile device 50 supplies power necessary for operation of door lock 10 and, thus, causes operation of control module 38, which, in turn, activates authentication module 39 to make control module 38 enter the identification information log-in procedure. Furthermore, when mobile device 50 is executing the authentication procedure, a to-be-identified identification information can be inputted through input device 52 of mobile device 50 and is transmitted to control module 38. Control module 38 executing the identification information log-in procedure stores the received to-be-identified identification information in main memory 40 as authenticated identification information. Thus, the log-in procedure of authenticated identification information is completed.

When it is desired to switch control module 38 from the identification information log-in procedure to the identification information log-in disabling procedure, it is set that control module 38 automatically switches to the identification information log-in disabling procedure after a data item of authenticated identification information has been logged in main memory 40. In another option, if authentication module 39 is operated again while control module 38 is executing the identification log-in procedure, control module 38 executes the identification information log-in disabling procedure. When control module 38 is executing the identification information log-in disabling procedure, the to-be-identified identification information transmitted from mobile device 50 is not permitted to be stored in main memory 40.

When at least one data item of authenticated identification information has been stored in main memory 40 of inner operating device 34, when it is desired to move from outside to inside of door 66, second contact-type connection interface 56 of mobile device 50 is electrically connected to first contact-type connection interface 32 of outer operating device 28, such that the access program of mobile device 50 is executed to proceed with the authentication procedure and the power supply procedure (but authentication module 39 is not operated). Thus, a to-be-identified identification information can be inputted through input device 52 of mobile device 50 to control module 38.

If control module 38 identifies that the to-be-identified identification information matches a data item of authenticated identification information stored in main memory 40, control module 38 outputs an unlocking signal to driving device 24 which drives locking mechanism 22 to thereby temporarily set latch device 20 to the unlocked state. When latch device 20 is temporarily set to the unlocked state, second contact-type connection interface 56 of mobile device 50 is disconnected from first contact-type connection interface 32 of outer operating device 28, and outer unlatching mechanism 30 of outer operating device 28 can be operated to move latch 26 from the latching position to the unlatching position to thereby permit subsequent opening of door 66. After latch 26 is moved by outer unlatching mechanism 30 to the unlatching position, control module 38 outputs a locking signal to driving device 24 which drives locking mechanism 22 to set latching device 20 to the locked state, such that outer unlatching mechanism 30 of outer operating device 28 cannot move latch 26 from the latching position to the unlatching position.

When latch device 20 is set to the unlocked state, no matter whether outer unlatching mechanism 30 of outer operating device 28 is operated to move latch 26 from the latching position to the unlatching position, delay module 43 starts to count down the delay time. Latch device 20 remains in the unlocked state during the countdown. After the countdown, control module 38 outputs a locking signal to driving device 24 which operates locking mechanism 22 to set latch device 20 to the locked state. Thus, even when latch 26 is not moved from the latching position to the unlatching position, latch device 20 will be set to the locked state after the countdown of the delay time.

When it is desired to open door 66 from the inside, since operation of inner unlatching mechanism 36 is not limited by locking mechanism 22, no matter whether latch device 20 is set to the locked state or unlocked state, inner unlatching mechanism 36 can be operated from inside of door 66 to move latch 26 from the latching position to the unlatching position to thereby open door 66.

Door lock 10 in the first embodiment does not provide a power source, and the electricity required for operation of door lock 10 is provided by mobile device 50 electrically connected to outer operating device 28. This solves the problem of inability to operate when the battery for conventional door locks is out of electricity. Furthermore, the manufacturing costs can be reduced.

Figure 5:
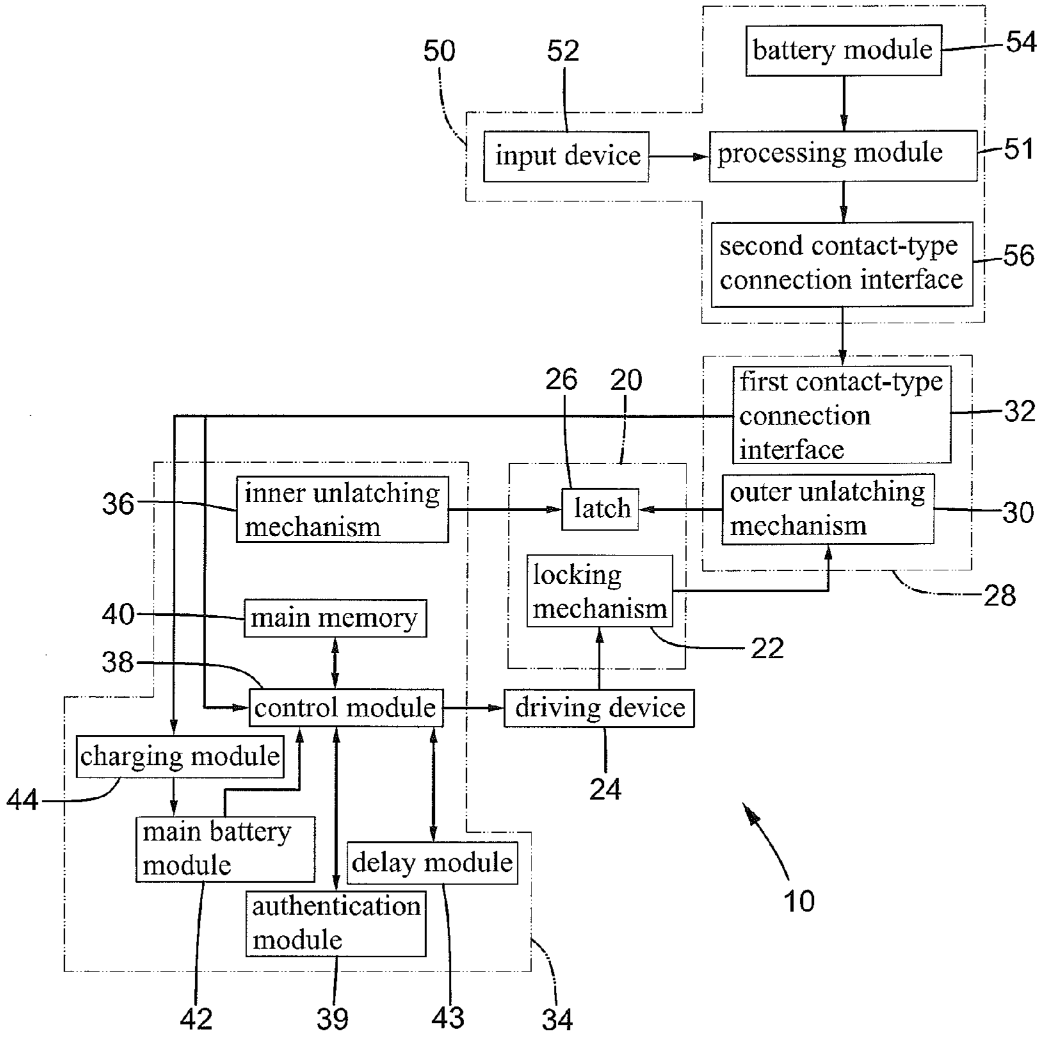
FIG. 5 is a diagrammatic block diagram illustrating a door lock with a mobile device of a second embodiment according to the present invention.

FIG. 5 shows a door lock 10 of a second embodiment according to the present invention which is substantially the same as the first embodiment. The difference between the two embodiments is that inner operating device 34 of the second embodiment further includes a main battery module 42 used as the power source and a charging module 44 electrically connected to main battery module 42. Furthermore, the access program installed in mobile device 50 will not execute the power supply procedure due to provision of main battery module 42 and charging module 44.

Assume door 66 is closed and latch device 20 is set to the locked state, when it is desired to open door 66 from the outside, second contact-type connection interface 56 of mobile device 50 is electrically connected to first contact-type connection interface 32 of outer operating device 28 to thereby execute the access program of mobile device 50 to proceed with the authentication procedure. At the same time, charging module 44 of inner operating device 34 detects the remaining electricity of main battery module 42. When the remaining electricity of main battery module 42 is sufficient (namely, the remaining electricity is greater than a threshold electricity value), control module 38 does not output any signal to connected mobile device 50 which will remain in the state executing the authentication procedure. On the other hand, when the remaining electricity of main battery module 42 is insufficient (namely, the remaining electricity is lower than the threshold electricity value), control module 38 outputs a charging signal to mobile device 50, and mobile device 50 executes the authentication procedure and the charging procedure. While mobile device 50 is executing the authentication procedure and the charging procedure, battery module 54 of mobile device 50 charges main battery module 42 via charging module 44 and provides the electricity required for operation of door lock 10.

It is noted that insufficient electricity of main battery module 42 detected by charging module 44 not only indicates that the remaining electricity of main battery module 42 is insufficient for operation of door lock 10. As an example of cooperation of charging module 44 and main battery module 42, the remaining electricity of main battery unit 42 can be identified by charging module 44 as "insufficient" if the electricity of main battery module 42 drops to be lower than 50% of the saturation voltage (the threshold electricity value). In this case, main battery module 42 can be charged every time mobile device 50 executes the charging procedure, such that the electricity of main battery module 42 can increase gradually. When charging module 44 detects that the electricity of main battery module 42 reaches 80% of the saturation voltage, charging module 44 outputs a charging stop signal to mobile device 50, and mobile device 50 stops the charging procedure.

When the to-be-identified identification information inputted through mobile device 50 matches a data item of authenticated identification information stored in main memory 40, latch device 20 is set to the unlocked state to permit operation of outer unlatching mechanism 30 for moving latch 26 from the latching position to the unlatching position. On the other hand, when the to-be-identified identification information inputted through mobile device 50 does not match any data item of the authenticated identification information stored in main memory 40, latch device 20 remains in the locked state not permitting operation of outer unlatching mechanism 30 for moving latch 26 from the latching position to the unlatching position.

The advantage of door lock 10 of the second embodiment is inner operating device 34 includes main battery module 42, such that when latch device 20 is set to the unlocked state, mobile device 50 can be removed from outer operating device 28 before operating outer unlatching mechanism 30 for moving latch 26 from the latching position to the unlatching position, because mobile device 50 does not directly provide electricity to inner operating device 34, driving device 24 can keep latch device 20 in the unlocked state until latch 26 moves from the latching position to the unlatching position or delay module 43 finishes countdown of the delay time.

The advantage of door lock 10 using charging module 44 is that if the electricity of main battery module 42 is insufficient, charging can be proceeded by mobile device 50 electrically connected to outer operating device 28 to effectively solve the problem of inability to operate the door lock due to insufficient battery electricity.

Figure 6:
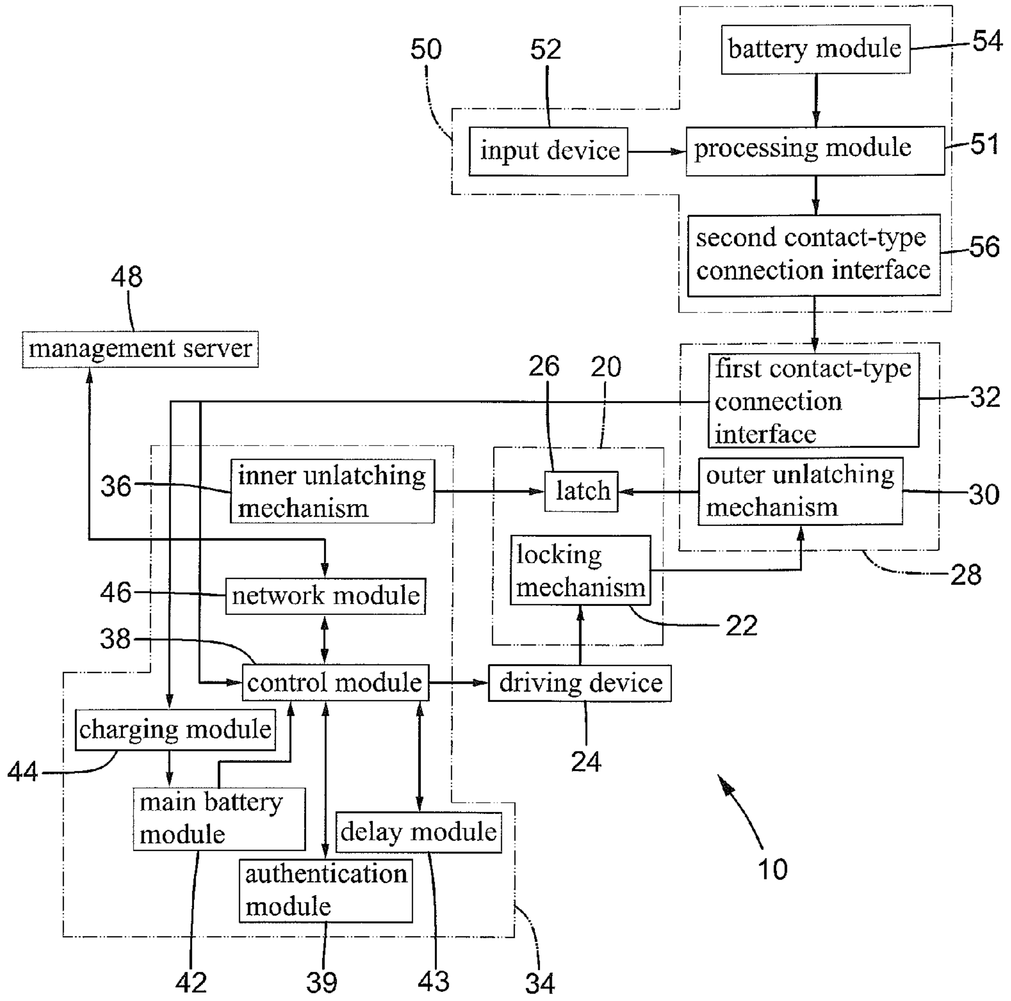
FIG. 6 is a diagrammatic block diagram illustrating a door lock with a mobile device of a third embodiment according to the present invention.

FIG. 6 shows a door lock 10 of a third embodiment according to the present invention. In comparison with the second embodiment, inner operating device 34 of door lock 10 does not include main memory 40 but includes a network module 46 electrically connected to control module 38. Door lock 10 of this embodiment further includes a management server 48 connected to network module 46 of inner operating device 34 by a wire network, a wireless network, the Internet, or the Global System for Mobile communications.

Since inner operating device 34 of door lock 10 of the third embodiment does not include main memory 40, when authentication module 39 is operated to execute the identification information log-in procedure, the to-be-identified identification information picked up through input device 52 of mobile device 50 is transmitted by control module 38 through network module 46 to management server 48 in which the to-be-identified identification information is saved as authenticated identification information. After authentication module 39 executes the identification information log-in disabling procedure, saving the to-be-identified identification information as authenticated identification information in management server 48 is not permitted.

Assume door 66 is closed and latch device 20 is set to the locked state, when it is desired to open door 66 from the outside, second contact-type connection interface 56 of mobile device 50 is electrically connected to first contact-type connection interface 32 of outer operating device 28 to thereby execute the access program of mobile device 50 to proceed with the authentication procedure. A to-be-identified identification information is inputted through input device 52 and is transmitted by control module 38 to management server 48 through network module 46. If management server 48 identifies that the to-be-identified identification information matches a data item of the authenticated identification information, management server 48 activates control module 38 to output an unlocking signal, such that driving device 24 actuates locking mechanism 22 to set latch device 20 to the unlocked state. On the other hand, when management server 48 identifies that the to-be-identified identification information does not match any data item of the authenticated identification information, management server 48 does not activate control module 38. Thus, control module 38 will not send any signal to driving device 24, and latch device 20 remains in the locked state.

Although door lock 10 of the third embodiment uses network module 46 and management server 48, network module 46 can be set to start operation when second contact-type connection interface 56 of mobile device 50 is electrically connected to first contact-type connection interface 32 of outer operating device 28. This can significantly reduce the burden to main battery module 42 to thereby achieve an electricity saving effect.

Since outer operating device 28 of door lock 10 in each embodiment does not include any input device (such as a fingerprint pickup device, a keypad, a touch screen, etc.) to effectively prevent burglars from using the trace left on the input device for stealing the identification information of door lock 10. The safety is improved, and the manufacturing costs are reduced.

Furthermore, door lock 10 of each embodiment uses electrical connection between second contact-type connection interface 56 of mobile device 50 and first contact-type connection interface 32 of outer operating device 28, such that wireless transmission modules that continuously or intermittently send out signals are not required. Even though door lock 10 of each of the second and third embodiments uses main battery module 42 to supply the electricity, the power consumption of main battery module 42 can be significantly reduced without using the wireless transmission modules.

Now that the basic teachings of the present invention have been explained, many extensions and variations will be obvious to one having ordinary skill in the art. For example, inner operating device 34 of door lock 10 of the first embodiment does not have to include delay module 43. Since door lock 10 of the first embodiment does not have any power source, when mobile device 50 is used to set latch device 20 to the unlocked state and then removes mobile device 50, driving device 24 of latch device 20 cannot retain the state of locking mechanism 22 without power supply. Thus, in the example without delay module 43, locking mechanism 22 can be returned by a biasing spring, such that latch device 20 will remain in the locked state when mobile device 50 is not in electrical connection to outer operating device 28.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A door lock comprising:

a latch device preset to a locked state;

a driving device operatively connected to the latch device, with the driving device configured to set the latch device to an unlocked state;

an inner operating device including a control module and a main memory electrically connected to the control module, with authenticated identification information stored in the main memory, and with the control module electrically connected to the driving device;

an outer operating device including a first contact-type connection interface electrically connected to the control module; and a mobile device including a processing module, a second contact-type connection interface, an input device, and a battery module, with the second contact-type connection interface, the input device, and the battery module electrically connected to the processing module, wherein the second contact-type connection interface is detachably connected to the first contact-type connection interface of the outer operating device, with the second contact-type connection interface in electrical connection with the first contact-type connection interface of the outer operating device, the mobile device executes an authentication procedure and a power supply procedure, a to-be-identified identification information is inputted through the input device to the control module, and the battery module of the mobile device provides electricity to the control module, with the second contact-type connection interface not in electrical connection with the first contact-type connection interface of the outer operating device, the latch device is in the locked state, the mobile device does not execute the authentication procedure and does not execute the power supply procedure, the to-be-identified identification information inputted through the input device is not sent to the control module, and the battery module of the mobile device does not provide electricity to the control module, wherein when the to-be-identified identification information in the control module matches the identified identification information in the main memory, the control module outputs a signal to the driving device to set the latch device to the unlocked state, wherein when the to-be-identified identification information in the control module does not match the identified identification information in the main memory, the control module does not output the signal to the driving device, and the latch device remains in the locked state, with the latch device including a locking mechanism operatively connected to the driving device and a latch movable between a latching position and an unlatching position, with the driving device configured to actuate the locking mechanism for setting the latch device to the unlocked state, with the outer operating device further including an outer unlatching mechanism operatively connected to the latch and the locking mechanism, with the latch device in the locked state, the latch does not move from the latching position to the unlatching position when the outer unlatching mechanism is operated, with the latch device in the unlocked state, the latch moves from the latching position to the unlatching position when the outer unlatching mechanism is operated, with the inner operating device further including a delay module preset with a delay time, with the latch device in the locked state, the delay module does not operate, and with the latch device in the unlocked state, the delay module starts countdown of the delay time, the latch device remains in the unlocked state during the countdown of the delay time, and after the countdown of the delay time, the control module outputs a locking signal to the driving device, the driving device actuates the locking mechanism to set the latch device to the locked state.

2. The door lock as claimed in claim 1, wherein the inner operating device further includes an inner unlatching mechanism, with the latch device in the locked state, the latch moves from the latching position to the unlatching position when the inner unlatching mechanism is operated, and with the latch device in the unlocked state, the latch moves from the latching position to the unlatching position when the inner unlatching mechanism is operated.

3. The door lock as claimed in claim 1, with the inner operating device further including an authentication module configured to execute an identification information log-in procedure or an identification information log-in disabling procedure, with the identification information log-in procedure executed by the authentication module, the to-be-identified identification information picked up by the input device of the mobile device is registered in the main memory as the authenticated identification information, and with the identification information log-in disabling procedure executed by the authentication module, the to-be-identified identification information picked up by the input device of the mobile device is not registered in the main memory as the authenticated identification information.

4. A door clock comprising:

a latch device preset to a locked state;

a driving device operatively connected to the latch device, with the driving device configured to set the latch device to an unlocked state;

an inner operating device including a control module and a main memory electrically connected to the control module, with authenticated identification information stored in the main memory, with the inner operating device further including a main battery module electrically connected to the control module and configured to supply electricity, and with the control module electrically connected to the driving device;

an outer operating device including, a first contact-type connection interface electrically connected to the control module; and a mobile device including a processing module, a second contact-type connection interface, an input device, and a battery module, with the second contact-type connection interface, the input device, and the battery module electrically connected to the processing module, wherein the second contact-type connection interface is detachably connected to the first contact-type connection interface of the outer operating device, with the second contact-type connection interface in electrical connection with the first contact-type connection interface of the outer operating device, the mobile device executes an authentication procedure, and a to-be-identified identification information is inputted through the input device to the control module, with the second contact-type connection interface not in electrical connection with the first contact-type connection interface of the outer operating device, the latch device is in the locked state, the mobile device does not execute the authentication procedure, and the to-be-identified identification information inputted through the input device is not sent to the control module, wherein when the to-be-identified identification information in the control module matches the identified identification information in the main memory, the control module outputs a signal to the driving device to set the latch device to the unlocked state, wherein when the to-be-identified identification information in the control module does not match the identified identification information in the main memory, the control module does not output the signal to the driving device, and the latch device remains in the locked state, with the inner operating device further including a charging module electrically connected between the main battery module and the first contact-type connection interface of the outer operating device, with the charging module configured to detect electricity of the main battery module, with the second contact-type connection interface in electrical connection with the first contact-type connection interface of the outer operating device, the mobile device does not execute a charging procedure when the electricity of the main battery module detected by the charging module is greater than a threshold electricity value, and the battery module of the mobile device does not charge the main battery module, and with the second contact-type connection interface in electrical connection with the first contact-type connection interface of the outer operating device, the mobile device executes the charging procedure when the electricity of the main battery module detected by the charging module is lower than the threshold electricity value, and the battery module of the mobile device charges the main battery module.

5. The door lock as claimed in claim 4, wherein the battery module of the mobile device charges the main battery module when the electricity of the main battery module detected by the charging module is lower than 50% of a saturation voltage of the main battery module, and wherein when the electricity of the main battery module detected by the charging module is larger than 80% of the saturation voltage of the main battery module, the charging module sends a charging stop signal to the mobile device to stop charging the main battery module.

6. The door lock as claimed in claim 4, with the latch device including a locking mechanism operatively connected to the driving device and a latch movable between a latching position and an unlatching position, with the driving device configured to actuate the locking mechanism for setting the latch device to the unlocked state, with the outer operating device further including an outer unlatching mechanism operatively connected to the latch and the locking mechanism, with the latch device in the locked state, the latch does not move from the latching position to the unlatching position when the outer unlatching mechanism is operated, and with the latch device in the unlocked state, the latch moves from the latching position to the unlatching position when the outer unlatching mechanism is operated.

7. The door lock as claimed in claim 6, with the inner operating device further includes an inner unlatching mechanism, with the latch device in the locked state, the latch moves from the latching position to the unlatching position when the inner unlatching mechanism is operated, and with the latch device in the unlocked state, the latch moves from the latching position to the unlatching position when the inner unlatching mechanism is operated.

8. The door lock as claimed in claim 4, with the inner operating device further including an authentication module configured to execute an identification information log-in procedure or an identification information log-in disabling procedure, with the identification information log-in procedure executed by the authentication module, the to-be-identified identification information picked up by the input device of the mobile device is registered in the main memory as the authenticated identification information, and with the identification information log-in disabling procedure executed by the authentication module, the to-be-identified identification information picked up by the input device of the mobile device is not registered in the main memory as the authenticated identification information.

9. A door lock comprising:

a latch device preset to a locked state;

a driving device operatively connected to the latch device, with the driving device configured to set the latch device to an unlocked state;

an inner operating device including a control module and a main memory electrically connected to the control module, with authenticated identification information stored in the main memory, with the inner operating device further including a main battery module electrically connected to the control module and configured to supply electricity, and with the control module electrically connected to the driving device;

an outer operating device including a first contact-type connection interface electrically connected to the control module; and a mobile device including a processing module, a second contact-type connection interface, an input device, and a battery module, with the second contact-type connection interface, the input device, and the battery module electrically connected to the processing module, wherein the second contact-type connection interface is detachably connected to the first contact-type connection interface of the outer operating device, with the second contact-type connection interface in electrical connection with the first contact-type connection interface of the outer operating device, the mobile device executes an authentication procedure, and a to-be-identified identification information is inputted through the input device to the control module, with the second contact-type connection interface not in electrical connection with the first contact-type connection interface of the outer operating device, the latch device is in the locked state, the mobile device does not execute the authentication procedure, and the to-be-identified identification information inputted through the input device is not sent to the control module, wherein when the to-be-identified identification information in the control module matches the identified identification information in the main memory, the control module outputs a signal to the driving device to set the latch device to the unlocked state, wherein when the to-be-identified identification information in the control module does not match the identified identification information in the main memory, the control module does not output the signal to the driving device, and the latch device remains in the locked state, with the latch device including a locking mechanism operatively connected to the driving device and a latch movable between a latching position and an unlatching position, with the driving device configured to actuate the locking mechanism for setting the latch device to the unlocked state, with the outer operating device further including an outer unlatching mechanism operatively connected to the latch and the locking mechanism, with the latch device in the locked state, the latch does not move from the latching position to the unlatching position when the outer unlatching mechanism is operated, with the latch device in the unlocked state, the latch moves from the latching position to the unlatching position when the outer unlatching mechanism is operated, with the inner operating device further including a delay module preset with a delay time, with the latch device in the locked state, the delay module does not operate, and with the latch device in the unlocked state, the delay module starts countdown of the delay time, the latch device remains in the unlocked state during the countdown of the delay time, and after the countdown of the delay time, the control module outputs a locking signal to the driving device, the driving device actuates the locking mechanism to set the latch device to the locked state.

10. The door lock as claimed in claim 9, with the inner operating device further including an authentication module configured to execute an identification information log-in procedure or an identification information log-in disabling procedure, with the identification information log-in procedure executed by the authentication module, the to-be-identified identification information picked up by the input device of the mobile device is registered in the main memory as the authenticated identification information, and with the identification information log-in disabling procedure executed by the authentication module, the to-be-identified identification information picked up by the input device of the mobile device is not registered in the main memory as the authenticated identification information.

11. A door lock comprising:

a latch device preset to a locked state;

a driving device operatively connected to the latch device, with the driving device configured to set the latch device to an unlocked state;

an inner operating device including a control module, a network module electrically connected to the control module, and a main battery module configured to supply electricity, and with the control module electrically connected to the driving device;

an outer operating device including a first contact-type connection interface electrically connected to the control module;

a mobile device including a processing module, a second contact-type connection interface, an input device, and a battery module, with the second contact-type connection interface, the input device, and the battery module electrically connected to the processing module, wherein the second contact-type connection interface is detachably connected to the first contact-type connection interface of the outer operating device, and a management server configured to selectively and electrically connected to the network module of the inner operating device, with authenticated identification information stored in the management server, with the second contact-type connection interface in electrical connection with the first contact-type connection interface of the outer operating device, the mobile device executes an authentication procedure, the network module is connected to the management server, and a to-be-identified identification information is inputted through the input device to the control module and is transmitted through the network module to the management server, with the second contact-type connection interface not in electrical connection with the first contact-type connection interface of the outer operating device, the latch device is in the locked state, the mobile device does not execute the authentication procedure, and the to-be-identified identification information inputted through the input device is not sent to the control module, wherein when the management server identifies that the to-be-identified identification information in the control module matches the identified identification information in the management server, the control module outputs a signal to the driving device to set the latch device to the unlocked state, wherein when the management server identifies that the to-be-identified identification information in the control module does not match the identified identification information in the management server, the control module does not output the signal to the driving device, and the latch device remains in the locked state, with the inner operating device further including a charging module electrically connected between the main battery module and the first contact-type connection interface of the outer operating device, with the charging module configured to detect electricity of the main battery module, with the second contact-type connection interface in electrical connection with the first contact-type connection interface of the outer operating device, the mobile device does not execute a charging procedure when the electricity of the main battery module detected by the charging module is greater than a threshold electricity value, and the battery module of the mobile device does not charge the main battery module, and with the second contact-type connection interface in electrical connection with the first contact-type connection interface of the outer operating device, the mobile device executes the charging procedure when the electricity of the main battery module detected by the charging module is lower than the threshold electricity value, and the battery module of the mobile device charges the main battery module.

12. The door lock as claimed in claim 11, with the latch device including a locking mechanism operatively connected to the driving device and a latch movable between a latching position and an unlatching position, with the driving device configured to actuate the locking mechanism for setting the latch device to the unlocked state, with the outer operating device further including an outer unlatching mechanism operatively connected to the latch and the locking mechanism, with the latch device in the locked state, the latch does not move from the latching position to the unlatching position when the outer unlatching mechanism is operated, and with the latch device in the unlocked state, the latch moves from the latching position to the unlatching position when the outer unlatching mechanism is operated.

13. The door lock as claimed in claim 12, with the inner operating device further includes an inner unlatching mechanism, with the latch device in the locked state, the latch moves from the latching position to the unlatching position when the inner unlatching mechanism is operated, and with the latch device in the unlocked state, the latch moves from the latching position to the unlatching position when the inner unlatching mechanism is operated.

14. The door lock as claimed in claim 11, with the inner operating device further including an authentication module configured to execute an identification information log-in procedure or an identification information log-in disabling procedure, with the identification information log-in procedure executed by the authentication module, the to-be-identified identification information picked up by the input device of the mobile device is registered in the main memory as authenticated identification information, and with the identification information log-in disabling procedure executed by the authentication module, the to-be-identified identification information picked up by the input device of the mobile device is not registered in the main memory as authenticated identification information.

15. A door lock comprising:

a latch device preset to a locked state;

a driving device operatively connected to the latch device, with the driving device configured to set the latch device to an unlocked state;

an inner operating device including a control module, a network module electrically connected to the control module, and a main battery module configured to supply electricity, and with the control module electrically connected to the driving device;

an outer operating device including a first contact-type connection interface electrically connected to the control module;

a mobile device including a processing module, a second contact-type connection interface, an input device, and a battery module, with the second contact-type connection interface, the input device, and the battery module electrically connected to the processing module, wherein the second contact-type connection interface is detachably connected to the first contact-type connection interface of the outer operating device, a management server configured to selectively and electrically connected to the network module of the inner operating device, with authenticated identification information stored in the management server, with the second contact-type connection interface in electrical connection with the first contact-type connection interface of the outer operating device, the mobile device executes an authentication procedure, the network module is connected to the management server, and a to-be-identified identification information is inputted through the input device to the control module and is transmitted through the network module to the management server, with the second contact-type connection interface not in electrical connection with the first contact-type connection interface of the outer operating device, the latch device is in the locked state, the mobile device does not execute the authentication procedure, and the to-be-identified identification information inputted through the input device is not sent to the control module, wherein when the management server identifies that the to-be-identified identification information in the control module matches the identified identification information in the management server, the control module outputs a signal to the driving device to set the latch device to the unlocked state, wherein when the management server identifies that the to-be-identified identification information in the control module does not match the identified identification information in the management server, the control module does not output the signal to the driving device, and the latch device remains in the locked state, with the latch device including a locking mechanism operatively connected to the driving device and a latch movable between a latching position and an unlatching position, with the driving device configured to actuate the locking mechanism for setting the latch device to the unlocked state, with the outer operating device further including an outer unlatching mechanism operatively connected to the latch and the locking mechanism, with the latch device in the locked state, the latch does not move from the latching position to the unlatching position when the outer unlatching mechanism is operated, and with the latch device in the unlocked state, the latch moves from the latching position to the unlatching position when the outer unlatching mechanism is operated, with the inner operating device further including a delay module preset with a delay time, with the latch device in the locked state, the delay module does not operate, and with the latch device in the unlocked state, the delay module starts countdown of the delay time, the latch device remains in the unlocked state during the countdown of the delay time, and after the countdown of the delay time, the control module outputs a locking signal to the driving device, the driving device actuates the locking mechanism to set the latch device to the locked state.

16. The door lock as claimed in claim 15, with the inner operating device further including an authentication module configured to execute an identification information log-in procedure or an identification information log-in disabling procedure, with the identification information log-in procedure executed by the authentication module, the to-be-identified identification information picked up by the input device of the mobile device is registered in the main memory as authenticated identification information, and with the identification information log-in disabling procedure executed by the authentication module, the to-be-identified identification information picked up by the input device of the mobile device is not registered in the main memory as authenticated identification information.

17. The door lock as claimed in claim 15, with the latch device including a locking mechanism operatively connected to the driving device and a latch movable between a latching position and an unlatching position, with the driving device configured to actuate the locking mechanism for setting the latch device to the unlocked state, with the outer operating device further including an outer unlatching mechanism operatively connected to the latch and the locking mechanism, with the latch device in the locked state, the latch does not move from the latching position to the unlatching position when the outer unlatching mechanism is operated, and with the latch device in the unlocked state, the latch moves from the latching position to the unlatching position when the outer unlatching mechanism is operated.

* * * * *